US008848766B2

(12) United States Patent
Lemson et al.

(10) Patent No.: US 8,848,766 B2
(45) Date of Patent: Sep. 30, 2014

(54) NEUTRAL HOST ARCHITECTURE FOR A DISTRIBUTED ANTENNA SYSTEM

(75) Inventors: Paul Lemson, Woodinville, WA (US); Shawn Patrick Stapleton, Burnaby (CA); Sasa Trajko Trajkovic, Burnaby (CA)

(73) Assignee: Dali Systems Co. Ltd., George Town, Grand Cayman (KY)

( * ) Notice: Subject to any disclaimer, the term of this patent is extended or adjusted under 35 U.S.C. 154(b) by 0 days.

(21) Appl. No.: 13/211,236

(22) Filed: Aug. 16, 2011

(65) Prior Publication Data
US 2012/0069880 A1 Mar. 22, 2012

Related U.S. Application Data (60) Provisional application No. 61/374,593, filed on Aug. 17, 2010.

(51) Int. Cl.
*H04B 1/38* (2006.01)
*H04B 1/18* (2006.01)
*H04B 1/40* (2006.01)

(52) U.S. Cl.
CPC ... *H04B 1/18* (2013.01); *H04B 1/40* (2013.01)
USPC .......................................................... 375/219

(58) Field of Classification Search
CPC ............. H04B 1/06; H04B 1/10; H04B 1/38; H04B 7/04; H04B 7/216; H04B 10/08; H04B 10/20; H04B 10/2575; H04B 10/27; H04J 3/00; H04J 14/00; H04M 1/00; H04W 4/06; H04W 16/24; H04W 36/06; H04W 40/00; H04W 72/00; H04W 72/06

USPC ................. 370/335, 338, 342, 345, 312, 328; 375/220, 297, 219, 222, 296; 398/59, 398/30, 45, 66, 68, 116; 455/20, 127.1, 455/550.1, 562.1, 212, 453
See application file for complete search history.

(56) References Cited

U.S. PATENT DOCUMENTS

| 5,880,863 A | 3/1999 | Rideout et al. |
| 6,625,429 B1 | 9/2003 | Yamashita |

(Continued)

FOREIGN PATENT DOCUMENTS

| WO | 2008/154077 A1 | 12/2008 |
| WO | 2012/024343 A1 | 2/2012 |
| WO | 2012/024349 A1 | 2/2012 |

OTHER PUBLICATIONS

Notification of Transmittal of the International Search Report and the Written Opinion of the International Searching Authority, or the Declaration; International Search Report and Written Opinion of the International Searching Authority for corresponding International Application No. PCT/US2011/047995 mailed Dec. 22, 2011, 7 pages.

(Continued)

*Primary Examiner* — Jaison Joseph
*Assistant Examiner* — Shawkat M Ali
(74) *Attorney, Agent, or Firm* — Kilpatrick Townsend & Stockton LLP (57) ABSTRACT

A remote radio head unit (RRU) system for achieving high data rate communications in a Distributed Antenna System is disclosed. The Distributed Antenna System is configured as a Neutral Host enabling multiple operators to exist on one DAS system. The present disclosure enables a remote radio head unit to be field reconfigurable and support multi-modulation schemes (modulation-independent), multi-carriers, multi-frequency bands and multi-channels. As a result, the remote radio head system is particularly suitable for wireless transmission systems, such as base-stations, repeaters, and indoor signal coverage systems.

10 Claims, 6 Drawing Sheets

Remote Radio Head Unit High Level System

(56) References Cited

U.S. PATENT DOCUMENTS

| | | |
|---|---|---|
| 7,102,442 B2 | 9/2006 | Anderson |
| 2002/0093926 A1 | 7/2002 | Kilfoyle |
| 2003/0181221 A1 | 9/2003 | Nguyen |
| 2005/0041968 A1* | 2/2005 | Takahashi ................. 398/30 |
| 2006/0270366 A1 | 11/2006 | Rozenblit et al. |
| 2008/0051129 A1 | 2/2008 | Abe et al. |
| 2008/0146146 A1 | 6/2008 | Binder et al. |
| 2008/0225816 A1 | 9/2008 | Osterling et al. |
| 2009/0029664 A1* | 1/2009 | Batruni ................. 455/212 |
| 2010/0008669 A1* | 1/2010 | Rhy et al. ................. 398/66 |

OTHER PUBLICATIONS

Notification of Transmittal of the International Search Report and the Written Opinion of the International Searching Authority, or the Declaration; International Search Report and Written Opinion of the International Searching Authority for corresponding International Application No. PCT/US2011/048004 mailed on Jan. 5, 2012, 6 pages.

* cited by examiner

Figure 1: PRIOR ART

Figure 2. Remote Radio Head Unit

Figure 3. Remote Radio Head Unit

Figure 4. Remote Radio Head Unit High Level System

Figure 5. Remote Radio Head Unit Access Module

Figure 6. Remote Radio Head Unit Band Module

NEUTRAL HOST ARCHITECTURE FOR A DISTRIBUTED ANTENNA SYSTEM

RELATED APPLICATIONS

This application claims the benefit of U.S. patent application Ser. No. 61/374,593, filed on Aug. 17, 2010, entitled NEUTRAL HOST ARCHITECTURE FOR A DISTRIBUTED ANTENNA, which is hereby incorporated by reference for all purposes.

FIELD OF THE INVENTION

The present invention generally relates to wireless communication systems employing Distributed Antenna Systems (DAS). More specifically, the present invention relates to a DAS which is part of a distributed wireless network base station in which all radio-related functions that provide network coverage and/or capacity for a given area are contained in a small single unit that can be deployed in a location remote from the remaining distributed wireless network base station unit or units which are not performing radio-related functions. Multi-mode radios capable of operating according to GSM, HSPA, LTE, TD-SCDMA, UMTS and WiMAX standards with advanced software configurability are features in the deployment of more flexible and energy-efficient radio networks. The present invention can also serve multiple operators and multi-frequency bands per operator within a single DAS to reduce the costs associated with radio network equipment and radio network deployment.

BACKGROUND OF THE INVENTION

Figure 1:
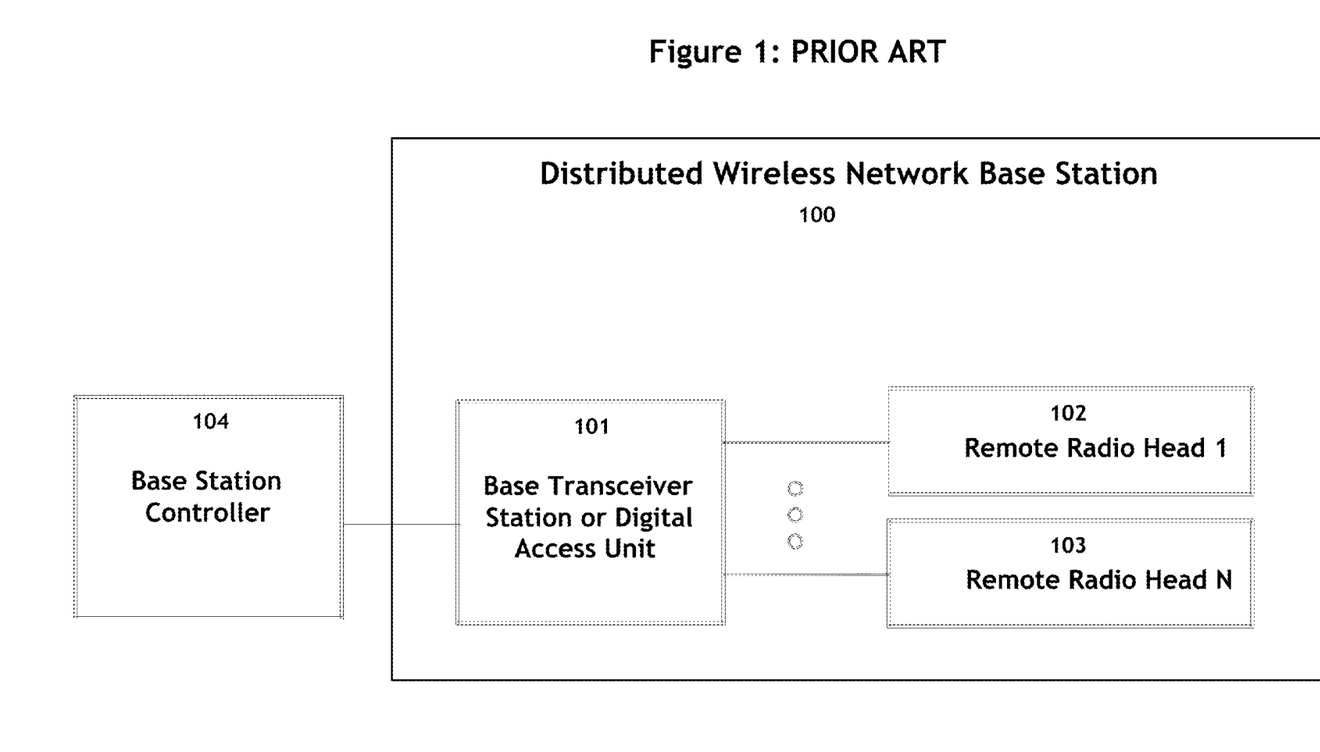
FIG. 1 [PRIOR ART] is a block diagram showing the basic structure of a prior art Distributed Wireless Base Station system.

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. In addition, network operators must consider the most cost-effective evolution of the networks towards 4G and other advanced network capabilities. Wireless and mobile technology standards are evolving towards higher bandwidth requirements for both peak rates and cell throughput growth. The latest standards supporting these higher bandwidth requirements are HSPA+, WiMAX, TD-SCDMA and LTE. The network upgrades required to deploy networks based on these standards must deal with the limited availability of new spectrum, leverage existing spectrum, and ensure operation of all desired wireless technology standards. The processes of scarce resource optimization while ensuring a future-proof implementation must both take place at the same time during the transition phase, which usually spans many years and thus can encompass numerous future developments. Distributed open base station architecture concepts have evolved in parallel with the evolution of the various technology standards to provide a flexible, lower-cost, and more scalable modular environment for managing the radio access evolution. Such advanced base station architectures can generally be appreciated from FIG. 1 [PRIOR ART], which shows an architecture for a prior art Distributed Wireless Network Base Station. In FIG. 1, 100 is a depiction of a Distributed Wireless Network Base Station. The Base Transceiver Station (BTS) or Digital Access Unit (DAU) 101 coordinates the communication between the Remote Radio Head Units 102, 103 and the Base Station Controller (BSC). The BTS communicates with multiple Remote Radio Heads via optical fiber. For example, the Open Base Station Architecture Initiative (OBSAI), the Common Public Radio Interface (CPRI), and the IR Interface standards introduced publicly-defined interfaces separating the Base Transceiver Station (BTS) or Digital Access Unit and the remote radio head unit (RRU) parts of a base station by employing optical fiber transport.

The RRU concept constitutes a fundamental part of an advanced state-of-the-art base station architecture. RRU-based system implementation is driven by the need to achieve consistent reductions in both Capital Expenses (CAPEX) and Operating Expenses (OPEX), and enable a more optimized, energy-efficient, and greener base deployment. An existing application employs an architecture where a 2G/3G/4G base station is connected to RRUs over multiple optical fibers. Either CPRI, OBSAI or IR Interfaces may be used to carry RF data to the RRUs to cover a sectorized radio network coverage area corresponding to a radio cell site. A typical implementation for a three-sector cell employs three RRU's. The RRU incorporates a large number of digital interfacing and processing functions. However, commercially available RRU's are power inefficient, costly and inflexible. Their poor DC-to-RF power conversion insures that they will need to have a large mechanical housing to help dissipate the heat generated. The demands from wireless service providers for future RRU's also includes greater flexibility in the RRU platform, which is not presently available. As standards evolve, there will be a need for multi-band RRUs that can accommodate two or more operators using a single wideband power amplifier. Co-locating multiple operators in one DAS system would reduce the infrastructure costs and centralize the Remote Monitoring Function of multiple Operators on the Network. To accommodate multiple operators and multiple bands per operator would require a very high optical data rate to the RRUs which is not achievable with prior art designs.

SUMMARY OF THE INVENTION

Figure 2:
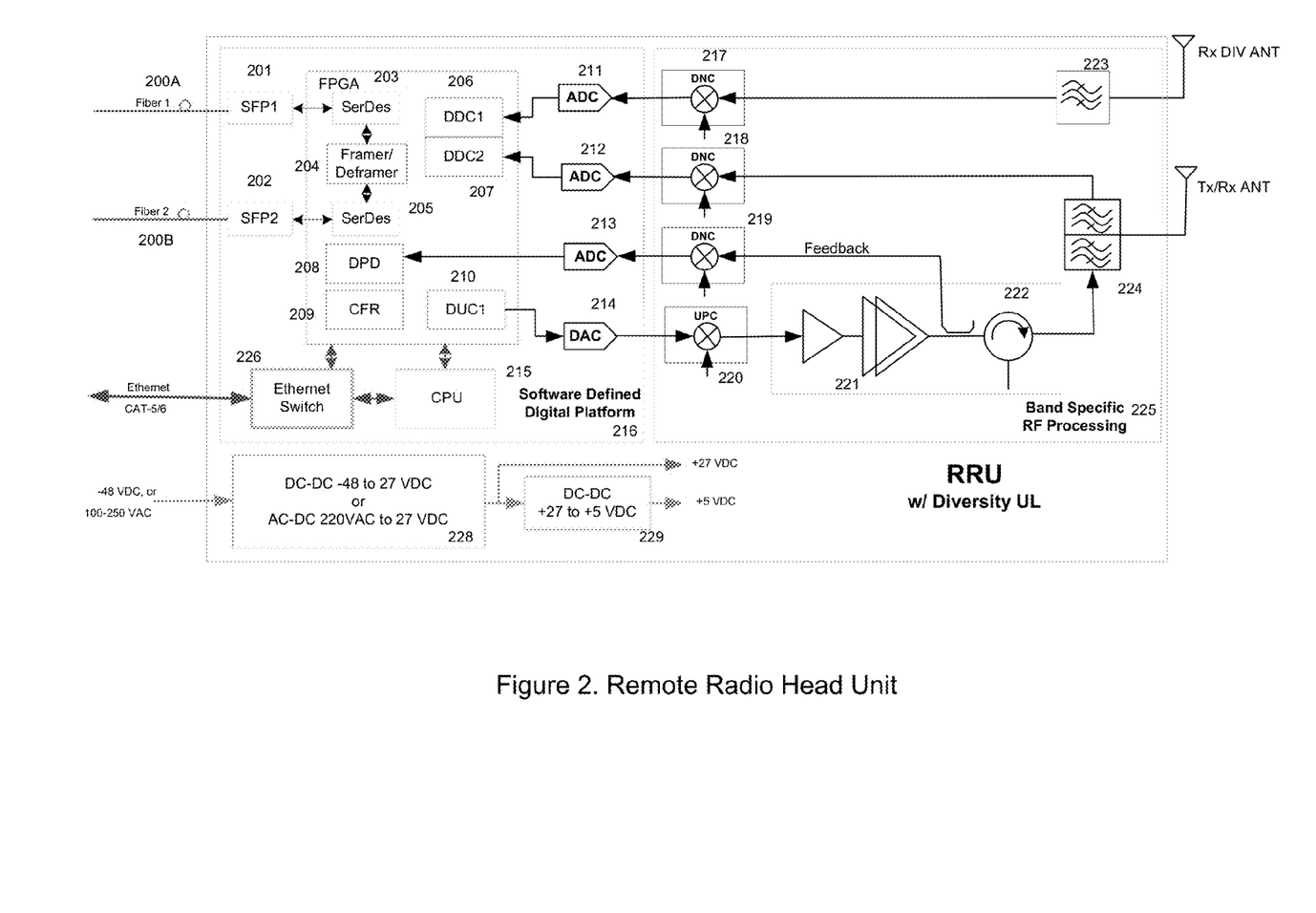
FIG. 2 is a block diagram showing a multi-channel High Power Remote Radio Head Unit according to one embodiment of the present invention.
Figure 3:
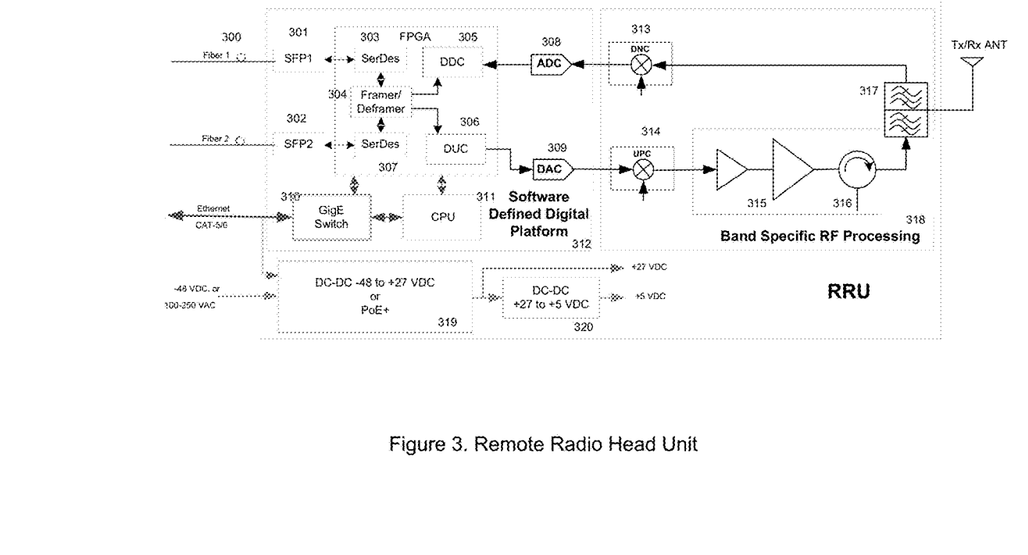
FIG. 3 is a block diagram multi-channel High Power Remote Radio Head Unit according to one embodiment of the present invention.

The present invention substantially overcomes the limitations of the prior art discussed above. Accordingly, it is an object of the present invention to provide a high performance, cost-effective DAS system, architecture and method for an RRU-based approach which enables each of multiple operators to use multi-frequency bands. The present disclosure enables a RRU to be field reconfigurable, as presented in U.S. Patent application U.S. 61/172,642, filed Apr. 24, 2009, entitled Remotely Reconfigurable Power Amplifier System and Method, U.S. patent application Ser. No. 12/108,502, filed Apr. 23, 2008, entitled Digital Hybrid Mode Power Amplifier System, U.S. Patent application U.S. 61/288,838, filed Dec. 21, 2009, entitled Multi-band Wideband Power Amplifier Digital Predistortion System, U.S. Patent application U.S. 61/288,840, filed Dec. 21, 2009, entitled Remote Radio Head Unit with Wideband Power Amplifier and Method, U.S. Patent application U.S. 61/288,844, filed Dec. 21, 2009, entitled Modulation Agnostic Digital Hybrid Mode Power Amplifier System, and U.S. Patent application U.S. 61/288,847, filed Dec. 21, 2009, entitled High Efficiency Remotely Reconfigurable Remote Radio Head Unit System and Method for Wireless Communications incorporated herein by reference. In addition, the system and method of the present invention supports multi-modulation schemes (modulation-independent), multi-carriers, multi-frequency bands, and multi-channels. To achieve the above objects, the present invention maximizes the data rate to the Remote Radio Head Unit in a cost effective architecture. FIGS. 2 and 3 depict a low power RRU and high power RRU. The RRUs depicted in FIGS. 2 and 3 can be extended to a multi-band and multi-channel configuration. Multi-band implies more than two frequency bands and multi-channel implies more than one output to an antenna system. Various embodiments of the invention are disclosed.

An embodiment of the present invention utilizes a RRU Access Module. The objective of the access module is to de-multiplex and multiplex high speed data to achieve aggregate data rates sufficient for operation of a plurality of RRU Band Modules which are geographically distributed. An alternative embodiment of the present invention utilizes the physical separation of the RRU Band Modules from the RRU Access Module using an optical fiber cable, Ethernet cables, RF cable and any other form of connection between the modules. In an alternative embodiment, a Remote Radio Unit comprised of one or more RRU Band Modules may be collocated with the antenna or antennas. In a further alternative embodiment, the RRU Access Module can also supply DC power on the interconnection cabling. In other aspects of the invention, control and measurement algorithms are implemented to permit improved network deployment, network management, and optimization.

Applications of the present invention are suitable to be employed with all wireless base-stations, remote radio heads, distributed base stations, distributed antenna systems, access points, repeaters, distributed repeaters, optical repeaters, digital repeaters, mobile equipment and wireless terminals, portable wireless devices, and other wireless communication systems such as microwave and satellite communications. The present invention is also field upgradable through a link such as an Ethernet connection to a remote computing center.

Appendix I is a glossary of terms used herein, including acronyms.

THE FIGURES

Further objects and advantages of the present invention can be more fully understood from the following detailed description taken in conjunction with the accompanying drawings in which.

DETAILED DESCRIPTION OF THE INVENTION

The present invention is a novel Distributed Antenna System that utilizes a high speed Remote Radio Head Unit Access Module interconnected with Remote Radio Head Unit Band Module.

An embodiment of a Remote Radio Head Unit in accordance with the invention is shown in FIG. 2. Fiber 1, indicated at 200A, is a high speed fiber cable that transports data between the BTS and the Remote Radio Head Unit. Fiber 2, indicated at 200B, is used to daisy chain other remote radio head units which are thereby interconnected to the BTS or DAU. The software-defined digital platform 216 performs baseband signal processing, typically in an FPGA or equivalent. Building block 203 is a Serializer/Deserializer. The deserializer portion extracts the serial input bit stream from the optical fiber 201 and converts it into a parallel bit stream. The serializer portion performs the inverse operation for sending data from the Remote Radio Head Unit to the BTS. In an embodiment, the two distinct bit streams communicate with the BTS using different optical wavelengths over one fiber, although multiple fibers can be used in alternative arrangements. The deframer 204 deciphers the structure of the incoming bit stream and sends the deframed data to the Crest Factor Reduction Algorithm 209. The Crest Factor Reduction block 209 reduces the Peak-to-Average Ratio of the incoming signal so as to improve the Power amplifier DC-to-RF conversion efficiency. The waveform is then presented to the Digital Predistorter block 208. The digital predistorter compensates for the nonlinearities of the Power Amplifier 221 in an adaptive feedback loop. Digital Upconverter 210 filters and digitally translates the deframed signal to an IF frequency. The Framer 204 takes the data from the two digital downconverters 206, 207 and packs it into a Frame for transmission to the BTS over the optical fiber 201. Elements 211 and 212 are Analog to Digital converters that are used to translate the two analog receive signals into digital signals. The receiver comprises a diversity branch which contains a downconverter 217 and a Band Pass Filter 223. The main branch has a receiver path comprised of a duplexer 224 and a downconverter 218. In some embodiments, one or both downconverters 217 and 218 can have an integral uplink low-noise amplifier.

The power amplifier has an output coupler for extracting a replica of the output signal in the feedback path. The feedback signal is frequency-translated by downconverter 219 to either an IF frequency or baseband and presented to an Analog to Digital converter 213. This feedback signal is used in an adaptive loop for performing Digital Predistortion to compensate for any nonlinearities created by the power amplifier.

The Ethernet cable is used to locally communicate with the Remote Radio Head Unit. Switch 226 is used to allow easy access to either the FPGA or the CPU. DC power converters 228 and 229 are used to obtain the desired DC voltages for the Remote Radio Head Unit. Either an external voltage can be connected directly into the RRU or the DC power may be supplied through the Ethernet cable.

Although the description of the instant embodiment is directed to an application where a second optical fiber connection provides a capability for daisy chaining to other Remote Radio Head Units, an alternative embodiment provides multiple optical fiber connections to support a modified "hybrid star" configuration for appropriate applications which dictate this particular optical transport network configuration.

FIG. 3 depicts a remote radio head unit. In at least some designs, this architecture offers benefits when the RF output power is relatively low. In the embodiment shown in FIG. 3, digital predistortion and crest factor reduction are not employed as was the case in FIG. 2. Even though this topology shows a non-diversity configuration, a diversity receive branch can be added along with an additional transmitter path for development of a Multiple Input Multiple Output (MIMO) Remote Radio Head Unit.

Figure 4:
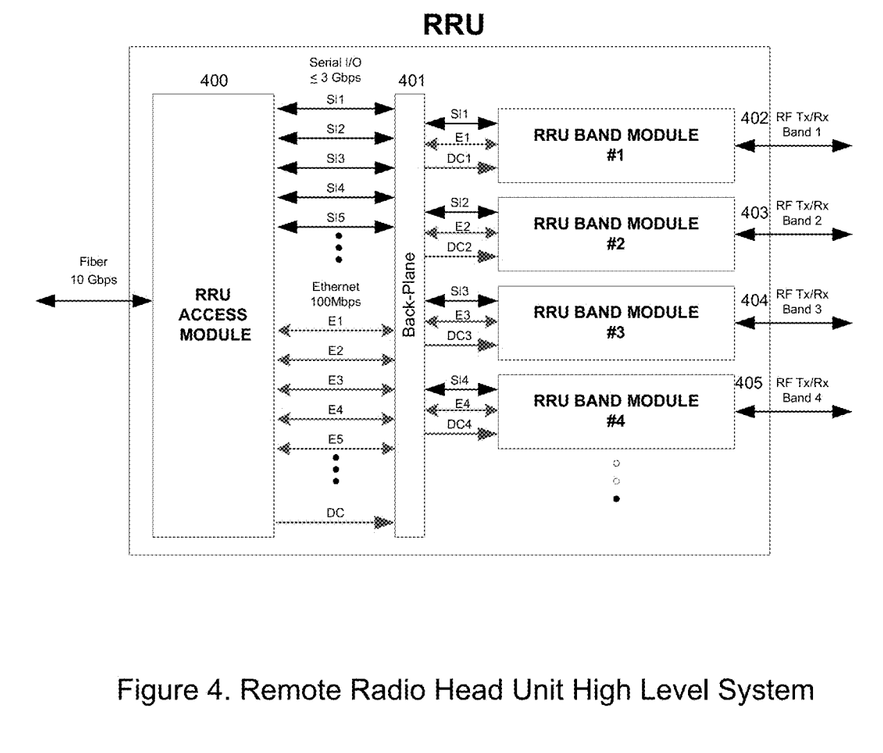
FIG. 4 is a block diagram of a Remote Radio Head Unit high level system of the present invention.

The Remote Radio Head Unit high level system is shown in FIG. 4. It comprises a Remote Radio Head Unit Access Module 400 which communicates directly with the BTS or DAU. The function of the Remote Radio Head Unit Access Module 400 is to route the high speed data (at any desired speed, e.g., such as 10 Gbps as illustrated in FIG. 4) (the "Data Speed) to the multiple Remote Radio Head Unit Band Modules and allows for local communications with them via Ethernet. A backplane 401 is used to interconnect the Remote Radio Head Unit Access Module 400 with the various Remote Radio Head Unit Band Modules 402,403,404,405 at any speed lower than the Data Speed (e.g., less than or equal to 3 Gbps as illustrated in FIG. 4). The output ports of the Remote Radio Head Unit Band Modules are combined and sent to an antenna for transmission. An alternative embodiment is described as follows. Although the description of instant embodiment is directed to applications for up to four Remote Radio Head Unit Band Modules, an alternative embodiment involves feeding a much larger quantity of Remote Radio Head Unit Band Modules with signals of various bandwidths at various frequency bands covering multiple octaves of frequency range, to support a wide range of applications including location-based services, mobile internet, public safety communications, private enterprise telecommunications and broadband, and other wireless applications. The system can in theory support an infinite quantity of RRUs. Also, the Remote Radio Head Unit Band Modules may be set up remotely to have RF power values selected based on the specific desired applications as well as location-specific radio signal propagation factors. A further alternative embodiment leverages the flexibility of the architecture shown in FIG. 4 to provide a capability known as Flexible Simulcast. With Flexible Simulcast, the amount of radio resources (such as RF carriers, CDMA codes or TDMA time slots) assigned to a particular RRU or group of RRUs by each RRU Access Module can be set via software control to meet desired capacity and throughput objectives or wireless subscriber needs.

Figure 5:
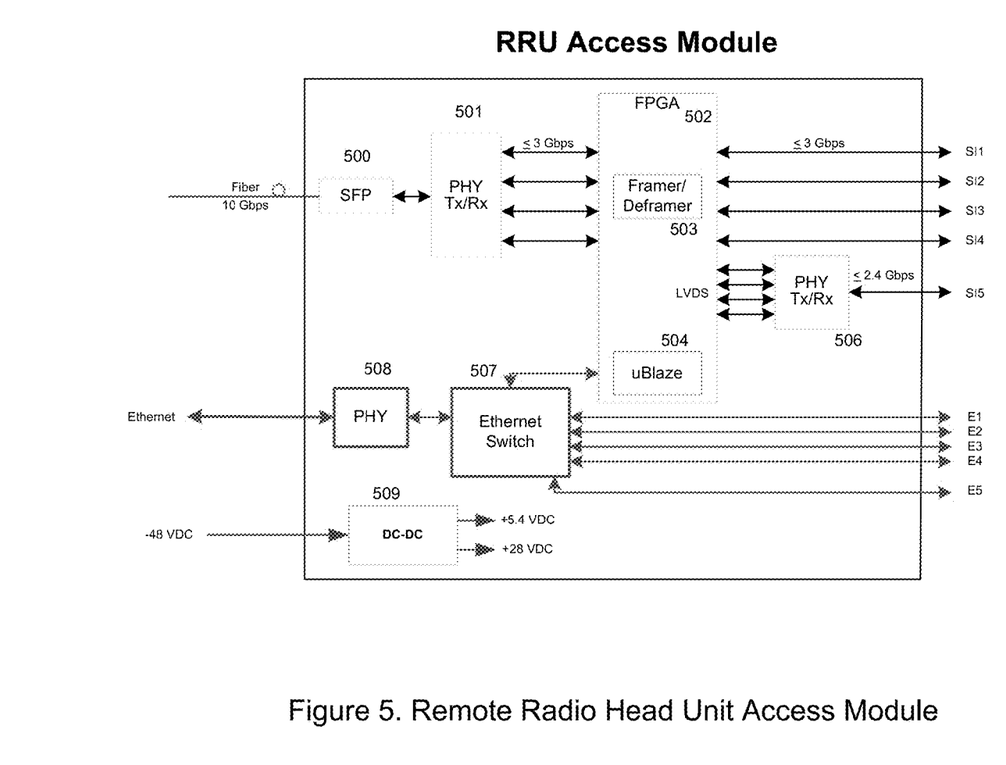
FIG. 5 is a block diagram of the Remote Radio Head Unit Access Module of the present invention.

The detailed topology of the Remote Radio Head Unit Access Module is shown in FIG. 5. It comprises a Small form Factor Pluggable optic transceiver (SFP) 500 which operates on two distinct wavelengths, one for communicating from the BTS to the Remote Radio Head Unit Access Module and the other for communicating in the opposite direction. The SFP contains a Laser Diode for converting the electronic signal to an optical signal and an Optical detector for converting the optical signal into an electronic signal. A multiplexer/demultiplexer 501 converts the high speed data to multiple lower speed data paths for delivery to a FPGA 502. The multiplexer/demultiplexer 501 performs the opposite function when data is being sent back to the BTS or DAU. The framer/deframer 503 routes the data to the appropriate Remote Radio Head Unit Band Modules. An additional multiplexer/demultiplexer 506 allows for further expansion of lower speed Remote Radio Head Units. The number of Remote Radio Head units is only limited by the capability of the FPGA. Local communication with the Remote Radio Head Unit's Access Module's FPGA or the individual Remote Radio Head Unit Band Modules is via an Ethernet connection 508. Although the description of this embodiment is mainly directed to an application where a BTS or DAU (or multiple BTS or DAU) feeds the Remote Radio Head Unit Access Module, an alternative embodiment is described as follows. The alternative embodiment is one where the digital optical signals fed to the Remote Radio Head Unit Access Module may be generated by an RF-to-Digital interface which receives RF signals by means of one or more antennas directed to one or more base stations located at some distance from the Remote Radio Head Unit Access Module. A further alternative embodiment is one where the digital signals fed to the Remote Radio Head Unit Access Module may be generated in a combination of ways; some may be generated by an RF-to-Digital interface and some may be generated by a BTS or DAU. Some neutral host applications gain an advantage with regard to cost-effectiveness from employing this further alternative embodiment. Although the optical signals fed to the Remote Radio Head Unit Access Module described in the preferred and alternative embodiments are digital, the optical signals are not limited to digital, and can be analog or a combination of analog and digital. A further alternative embodiment employs transport on one or multiple optical wavelengths fed to the Remote Radio Head Unit Access Module.

Figure 6:
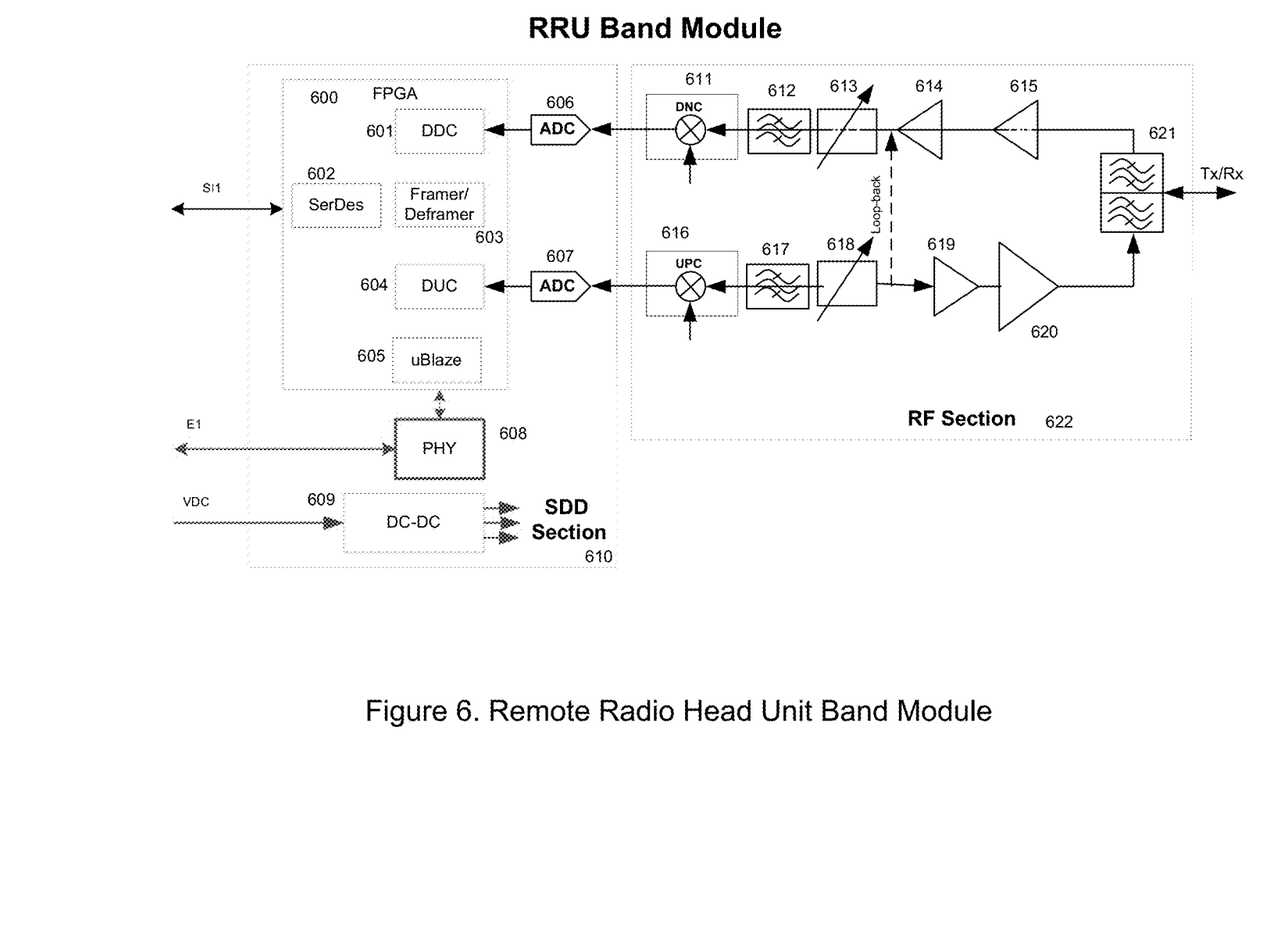
FIG. 6 is a Remote Radio Head Unit Band Module according to one embodiment of the present invention.

The Remote Radio Head Unit Band Module is shown in FIG. 6. It comprises a Software Defined Digital (SDD) section 610 and an RF section 622. An alternative embodiment employs a Remote Antenna Unit comprising a broadband antenna with RRU Band Module Combiner and multiple plug-in module slots, into which multiple RRU Band Modules intended for operation in different frequency bands are inserted. To provide an overall compact unit with low visual impact, this embodiment employs RRU Band Modules which each have a physically small form factor. One example of a suitably small form factor for the RRU Band Module is the PCMCIA module format. A further alternative embodiment employs RRU Band Modules where each has an integral antenna, and the embodiment does not require a common antenna shared by multiple RRU Band Modules.

In summary, the Neutral Host Distributed Antenna System (NHDAS) of the present invention enables the use of remote radio heads for multi-operator multi-band configurations, which subsequently saves hardware resources and reduces costs. The NHDAS system is also reconfigurable and remotely field-programmable since the algorithms can be adjusted like software in the digital processor at any time.

Moreover, the NHDAS system is flexible with regard to being able to support various modulation schemes such as QPSK, QAM, OFDM, etc. in CDMA, TD-SCDMA, GSM, WCDMA, CDMA2000, LTE and wireless LAN systems. This means that the NHDAS system is capable of supporting multi-modulation schemes, multi-bands and multi-operators.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A remotely reconfigurable remote radio head unit for transporting radio frequency signals, receiving uplink radio frequency signals and outputting downlink radio frequency signals, the remotely reconfigurable remote radio head unit comprising: at least one remotely reconfigurable access module configured to receive reconfiguration parameters from a remote location; a plurality of band modules, each of the plurality of band modules having separately reconfigurable parameters in response to the reconfiguration parameters received from the at least one remotely reconfigurable access module and each of the plurality of band modules supporting one of a plurality of frequency bands of the radio frequency signals being transported, wherein the plurality of band modules and the at least one reconfigurable access module configured to communicate via Ethernet; an interface configured to provide electrical and mechanical connection for mounting each of the plurality of band modules for providing bidirectional communication between the at least one remotely reconfigurable access module and each of the plurality of band modules at a speed less than or equal to 3 Gbps; a crest factor reduction algorithm configured to reduce a peak-to-average ratio signature of an incoming signal; and radio resources configured to provide a Flexible Simulcast capability.

2. The remotely reconfigurable remote radio head unit of claim 1 wherein the separately reconfigurable parameters comprise at least one of an operator, frequency, and carrier.

3. The remotely reconfigurable remote radio head unit of claim 2 wherein each of the plurality of band modules further comprises a field programmable gate array for storing the reconfigurable parameters for that band module.

4. The remotely reconfigurable remote radio head unit of claim 1 wherein each of the plurality of band modules further comprises a framer, deframer, serializer, and deserializer.

5. The remotely reconfigurable remote radio head unit of claim 1 wherein each of the plurality of band modules further comprises one or more power amplifiers.

6. The remotely reconfigurable remote radio head unit of claim 5 wherein each of the plurality of band modules further comprises one or more digital predistorters.

7. The remotely reconfigurable remote radio head unit of claim 1 further comprising at least one integral uplink low-noise amplifier.

8. The remotely reconfigurable remote radio head unit of claim 1 wherein the at least one remotely reconfigurable access module is disposed in a modified hybrid star configuration.

9. The remotely reconfigurable remote radio head unit of claim 1 wherein the at least one remotely reconfigurable access module comprises a small form factor pluggable optic transceiver configured to operate on at least two distinct wavelengths.

10. The remotely reconfigurable remote radio head unit of claim 1 wherein each of the plurality of band modules comprises a software configurable digital section and a radio frequency section.

* * * * *